(12) United States Patent
Nakaya

(10) Patent No.: US 12,140,197 B2
(45) Date of Patent: Nov. 12, 2024

(54) ROTARY DAMPER

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 299 days.

(21) Appl. No.: 17/755,258

(22) PCT Filed: Aug. 7, 2020

(86) PCT No.: PCT/JP2020/030485
§ 371 (c)(1),
(2) Date: Apr. 25, 2022

(87) PCT Pub. No.: WO2021/100262
PCT Pub. Date: May 27, 2021

(65) Prior Publication Data
US 2022/0381313 A1  Dec. 1, 2022

(30) Foreign Application Priority Data
Nov. 21, 2019 (JP) ................... 2019-210245

(51) Int. Cl.
*F16F 9/14* (2006.01)
*F16F 9/32* (2006.01)

(52) U.S. Cl.
CPC ............ *F16F 9/145* (2013.01); *F16F 9/3235* (2013.01)

(58) Field of Classification Search
CPC ........ F16F 9/145; F16F 9/3235; F16F 9/3207; F16F 9/34; F16F 9/14; F16F 2230/0005
See application file for complete search history.

(56) References Cited

U.S. PATENT DOCUMENTS 4,674,608 A  6/1987 Morris et al.
4,913,255 A * 4/1990 Takayanagi .......... B62K 25/286
                                                                267/277

(Continued)

FOREIGN PATENT DOCUMENTS

CN  1605768 A  *  4/2005  .............. F16F 9/145
CN  108105319 A  *  6/2018  ............. A47K 13/12

(Continued)

OTHER PUBLICATIONS

Extended European Search Report of European Patent Application No. 20890035.7 issued on Nov. 21, 2023.

(Continued)

*Primary Examiner* — Vishal R Sahni
(74) *Attorney, Agent, or Firm* — Pearne & Gordon LLP

(57) ABSTRACT

There is provided a rotary damper of which size can be easily reduced. The rotary damper (100) includes a housing (101). The housing (101) includes a rotor (120) in a bottomed cylindrical housing body (102), and is closed by a lid (140). An inner chamber (103) in the housing body (102) is divided into three cells including a first cell R1, a second cell R2, and a third cell R3 by a fixed vane (104) and movable vanes (124, 125) of the rotor (120). At the rotor (120), a cylindrical tubular support portion (122) is formed inside the movable vanes (124, 125). The lid (140) is formed with a cylindrical first rotor support portion (141) turnably supporting the tubular support portion (122). The first rotor support portion (141) supports the tubular support portion (122) at a center portion of the length of each of the movable vanes (124, 125) in an axial direction of the rotor (120).

11 Claims, 7 Drawing Sheets

(56) References Cited

U.S. PATENT DOCUMENTS

| | | | |
|---|---|---|---|
| 5,450,932 A | 9/1995 | Nash | |
| 5,720,370 A | 2/1998 | Takahashi | |
| 2003/0111308 A1* | 6/2003 | VanValkenburgh | B62K 21/08 188/290 |
| 2006/0191756 A1* | 8/2006 | Moradian | F16F 9/145 188/294 |
| 2010/0205774 A1* | 8/2010 | Yoshida | E05F 5/00 16/250 |
| 2013/0247330 A1* | 9/2013 | Daul | E05D 11/00 16/319 |
| 2015/0275999 A1 | 10/2015 | Mori et al. | |

FOREIGN PATENT DOCUMENTS

| | | | | |
|---|---|---|---|---|
| DE | 102018116187 A1 * | 1/2020 | | A63B 21/0056 |
| EP | 1457704 A1 * | 9/2004 | | F16F 9/145 |
| JP | H02-102035 U | 8/1990 | | |
| JP | H03-110229 U | 11/1991 | | |
| JP | 06337031 A * | 5/1993 | | |
| JP | H06-337031 A | 12/1994 | | |
| JP | H08-303513 A | 11/1996 | | |
| JP | 2004183888 A * | 7/2004 | | F16F 9/145 |
| JP | 2009185901 A * | 8/2009 | | |
| JP | 2012-197863 A | 10/2012 | | |
| JP | 2014-005883 A | 1/2014 | | |
| JP | 2015-194198 A | 11/2015 | | |
| JP | 2017210980 A * | 11/2017 | | F16F 9/14 |
| JP | 2018084284 A * | 5/2018 | | F16F 9/14 |
| WO | 2009-044910 A1 | 4/2009 | | |
| WO | WO-2012132097 A1 * | 10/2012 | | B60N 2/22 |
| WO | WO-2018168788 A1 * | 9/2018 | | F16F 9/14 |

OTHER PUBLICATIONS

International Search Report dated Sep. 8, 2020 issued in PCT/JP2020/030485.

\* cited by examiner

ROTARY DAMPER

TECHNICAL FIELD

The present invention relates to a rotary damper. The rotary damper is used as a kinetic energy damping device in a turning mechanism of an industrial mechanical tool such as a joint of an articulated robot.

BACKGROUND ART

Typically, in a four-wheeled or two-wheeled self-propelled vehicle or an industrial mechanical tool, a rotary damper is used as a kinetic energy damping device in a turning mechanism. For example, in a rotary damper disclosed in Patent Literature 1 below, both end portions of a rotor having two blade-shaped movable vanes at an outer peripheral portion of a shaft are turnably supported on a cylindrical housing directly or through plugs.

CITATION LIST

Patent Literature

PATENT LITERATURE 1: JP-A-2014-5883

SUMMARY OF INVENTION

However, in the rotary damper disclosed in Patent Literature 1 above, the rotor is supported on the housing through shaft portions at both ends. Thus, there is a problem that it is difficult to reduce the rotary damper in size.

The present invention has been made for coping with the above-described problem. An object of the present invention is to provide a rotary damper of which size can be easily reduced.

In order to achieve the above object, as a feature of the present invention, there is provided a rotary damper including: a housing having a cylindrical inner chamber for liquid-tightly housing fluid and having a fixed vane formed in a wall shape along a radial direction in the inner chamber to prevent a flow of the fluid in a peripheral direction; a rotor formed with a penetrating or bottomed tubular support portion in a shaft and having, at an outer peripheral portion of the shaft outside the tubular support portion, a movable vane turning to push the fluid while dividing an inside of the inner chamber; a lid provided at the housing to liquid-tightly close the inner chamber; and at least two cells formed by the fixed vane and the movable vane in the inner chamber and having volumes increased or decreased according to a turning direction of the movable vane, the rotary damper further including a cylindrical or shaft-shaped first rotor support portion formed at one of the housing or the lid to turnably support an inner peripheral surface of the tubular support portion of the rotor, wherein the first rotor support portion supports the tubular support portion at a center portion of a length of the movable vane in an axial direction of the rotor.

According to the feature of the present invention configured as described above, in the rotary damper, the first rotor support portion supported on the housing or the lid turnably supports the tubular support portion of the rotor at the center portion of the length of the movable vane in the axial direction of the rotor. Thus, the length of the rotor is shortened as compared to the case of supporting both end portions of the rotor, so that the configuration of the rotary damper can be easily reduced in size.

Moreover, as another feature of the present invention, there is provided the rotary damper further including a second rotor support portion formed at another one of the housing or the lid to turnably support the shaft of the rotor, wherein the rotor is, at the shaft thereof, formed with a protruding shaft portion protruding in the axial direction with respect to the movable vane, and the second rotor support portion is formed in a cylindrical shape turnably supporting the protruding shaft portion.

According to another feature of the present invention configured as described above, the rotary damper includes the cylindrical second rotor support portion turnably supporting the protruding shaft portion protruding, at the shaft of the rotor, in the axial direction with respect to the movable vane. Thus, the second rotor support portion can cooperate with the first rotor support portion to stably support the rotor.

Moreover, as another feature of the present invention, in the rotary damper, the second rotor support portion turnably supports an outer peripheral portion of the protruding shaft portion.

According to another feature of the present invention configured as described above, in the rotary damper, the second rotor support portion turnably supports the outer peripheral portion of the protruding shaft portion. Thus, the configuration of the rotary damper can be simplified and reduced in size as compared to the case of supporting an inner peripheral portion of the protruding shaft portion.

Moreover, as another feature of the present invention, in the rotary damper, the protruding shaft portion is formed in a tubular shape having a through-hole communicating with the tubular support portion.

According to another feature of the present invention configured as described above, in the rotary damper, the protruding shaft portion is formed in the tubular shape having the through-hole communicating with the tubular support portion. Thus, a coupling portion of a target for attachment to the rotary damper can be inserted into and attached to the shaft of the rotor from any of both end portions of the shaft, and therefore, usability can be improved.

Moreover, as another feature of the present invention, in the rotary damper, only one fixed vane as said fixed vane is formed in the inner chamber.

According to another feature of the present invention configured as described above, in the rotary damper, only one fixed vane is formed in the inner chamber. Thus, the configuration of the rotary damper can be simplified and reduced in size while the movably-turning angle of the rotor can be increased.

Moreover, as another feature of the present invention, there is provided the rotary damper further including, at least at one of the fixed vane or the movable vane, a cushion configured to elastically contact another one of the fixed vane or the movable vane.

According to another feature of the present invention configured as described above, the rotary damper includes, at least at one of the fixed vane or the movable vane, the cushion configured to elastically contact the other one of the fixed vane or the movable vane. Thus, impact or damage due to collision of the movable vane with the fixed vane upon turning can be prevented.

Moreover, as another feature of the present invention, in the rotary damper, the housing includes, at a position adjacent to the inner chamber, an accumulator holding portion configured to hold an accumulator for absorbing a volume change in the inner chamber due to expansion or contraction of the fluid.

According to another feature of the present invention configured as described above, in the rotary damper, the housing includes, at the position adjacent to the inner chamber, the accumulator holding portion configured to hold the accumulator for absorbing a volume change in the inner chamber due to expansion or contraction of the fluid. Thus, the configuration of the rotary damper can be simplified and reduced in size. In this case, the accumulator holding portion is provided to project at an outer peripheral portion of the housing, so that the movable area of the rotor can be ensured. Moreover, the accumulator holding portion is provided to project into the inner chamber of the housing so that the configuration of the rotary damper can be reduced in size.

Moreover, as another feature of the present invention, there is provided the rotary damper further including, at least at one of the fixed vane or the movable vane, a communication path allowing the fluid to flow between cells adjacent to each other, wherein the communication path includes a filter configured to filter out a foreign substance contained in the fluid.

According to another feature of the present invention configured as described above, the rotary damper includes, at least at one of the fixed vane or the movable vane, the communication path allowing the fluid to flow between the cells adjacent to each other, and the communication path includes the filter configured to filter out the foreign substance contained in the fluid. Thus, a lock state brought due to a movable vane immovable state caused by clogging of the communication path can be prevented.

The communication path described herein includes a bidirectional communication path allowing the fluid to flow in both directions between two cells adjacent to each other and a one-way communication path allowing the fluid to flow only from one side to the other side between two cells. In this case, in the communication path, the flow of the fluid can be limited according to, e.g., the size of a flow path in which the fluid flows or a load interfering with the flow.

Moreover, as another feature of the present invention, there is provided the rotary damper further including: a bypass path allowing the at least two cells to communicate with each other; and an adjustment needle configured to adjust a flow rate of the fluid in the bypass path, wherein the bypass path is formed adjacent to the second rotor support portion of the housing or the lid.

According to another feature of the present invention configured as described above, in the rotary damper, the bypass path is formed adjacent to the second rotor support portion at the housing or the lid formed with the second rotor support portion supporting the protruding shaft portion. Thus, the bypass path is, together with the second rotor support portion, easily formed to project from the housing or the lid. Moreover, the rotary damper can be efficiently reduced in size as compared to the case of forming the bypass path at the housing or the lid on the side opposite to the second rotor support portion.

Moreover, as another feature of the present invention, in the rotary damper, the tubular support portion houses only the first rotor support portion in a space inside the tubular support portion.

According to another feature of the present invention configured as described above, in the rotary damper, the tubular support portion houses only the first rotor support portion in the space inside the tubular support portion. Thus, an increase in the size of the rotary damper in the radial direction can be avoided while a sufficient thickness of the first rotor support portion can be ensured and the stiffness of the first rotor support portion can be enhanced even in the case of forming the first rotor support portion in a tubular shape or in a solid columnar shape.

DESCRIPTION OF EMBODIMENTS

Figure 1:
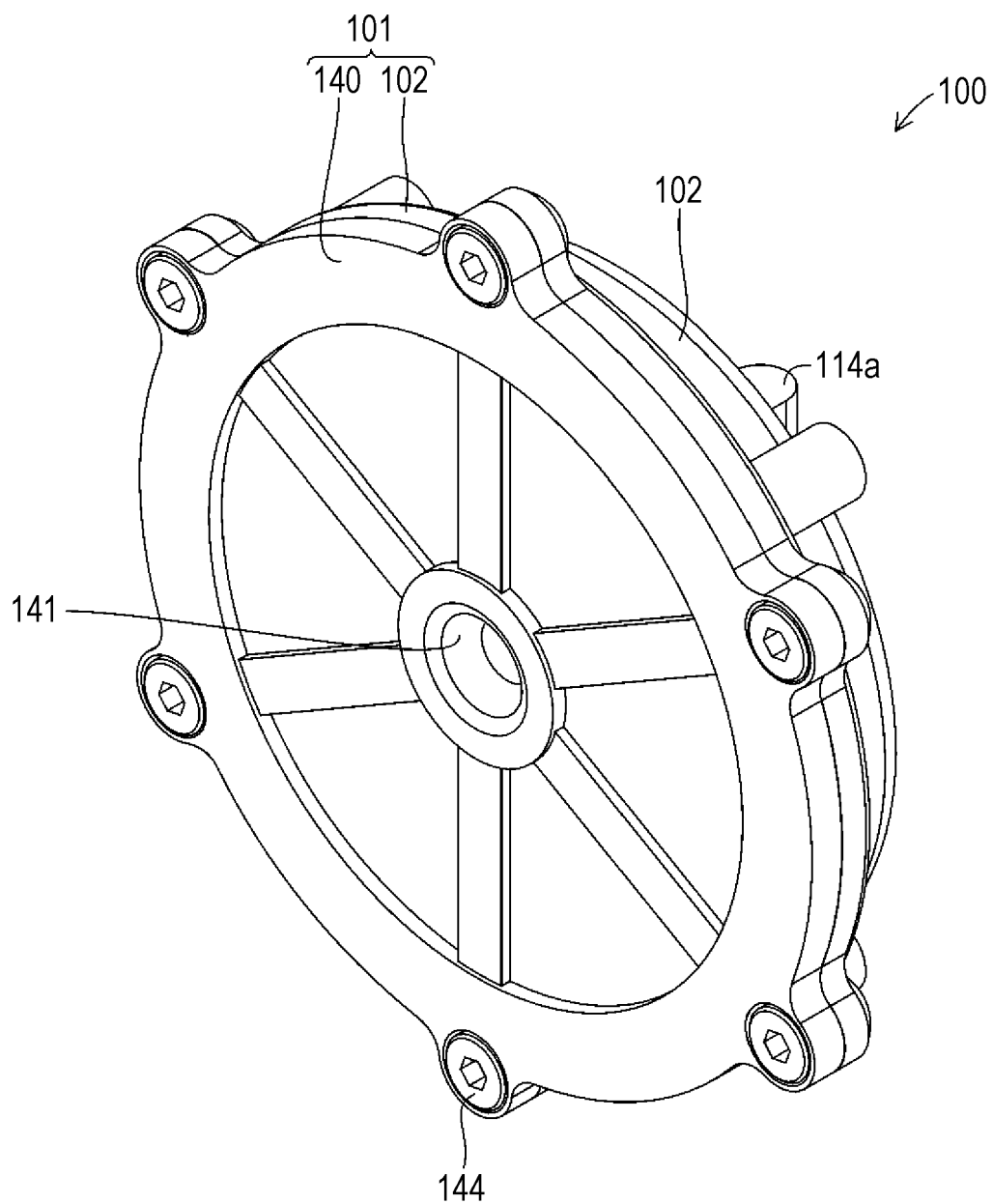
FIG. 1 is a perspective view showing the outline of an entire configuration of a rotary damper according to the present invention from a lid side.
Figure 2:
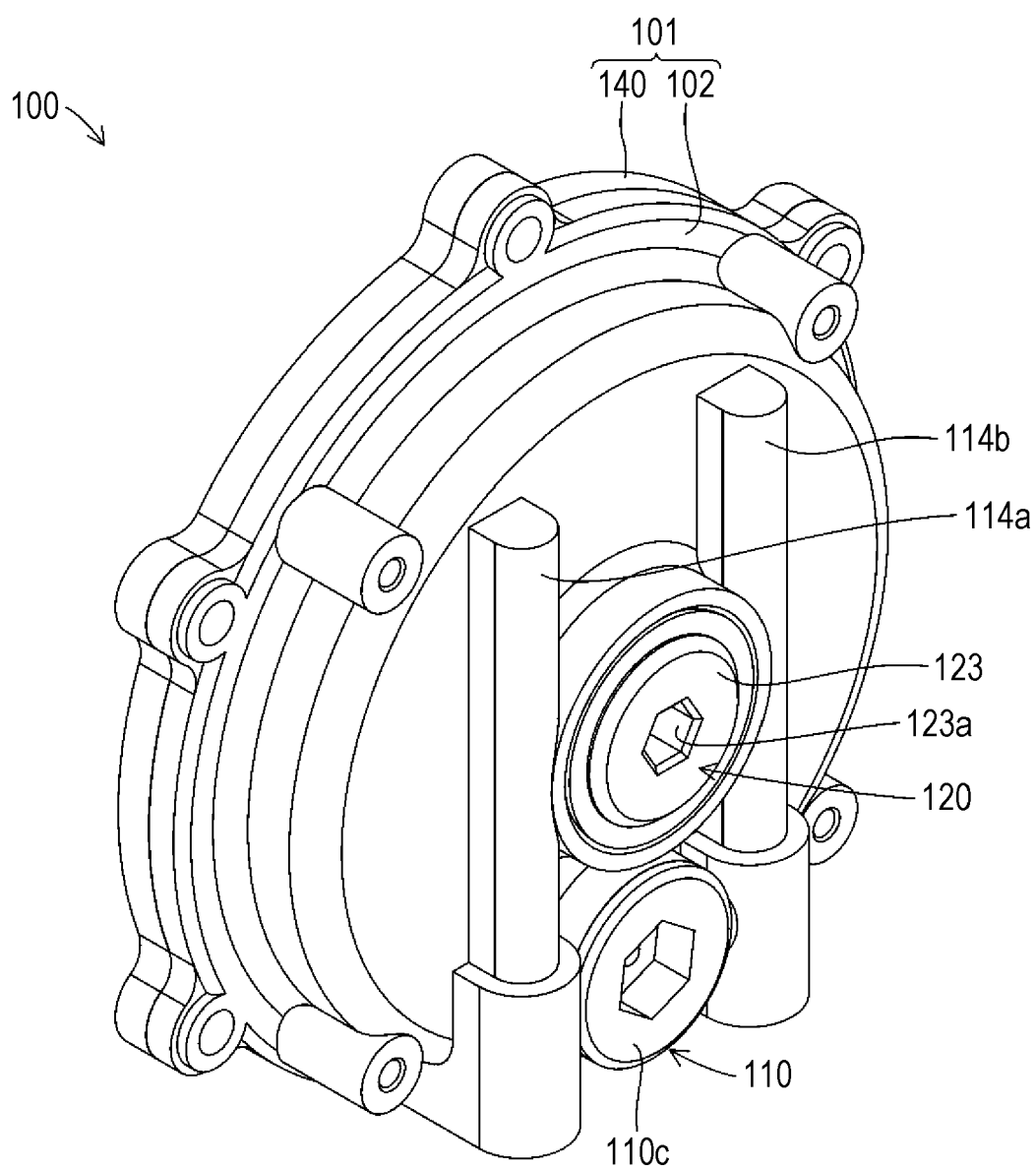
FIG. 2 is a perspective view showing the outline of the entire configuration of the rotary damper of FIG. 1 from a housing body side.
Figure 3:
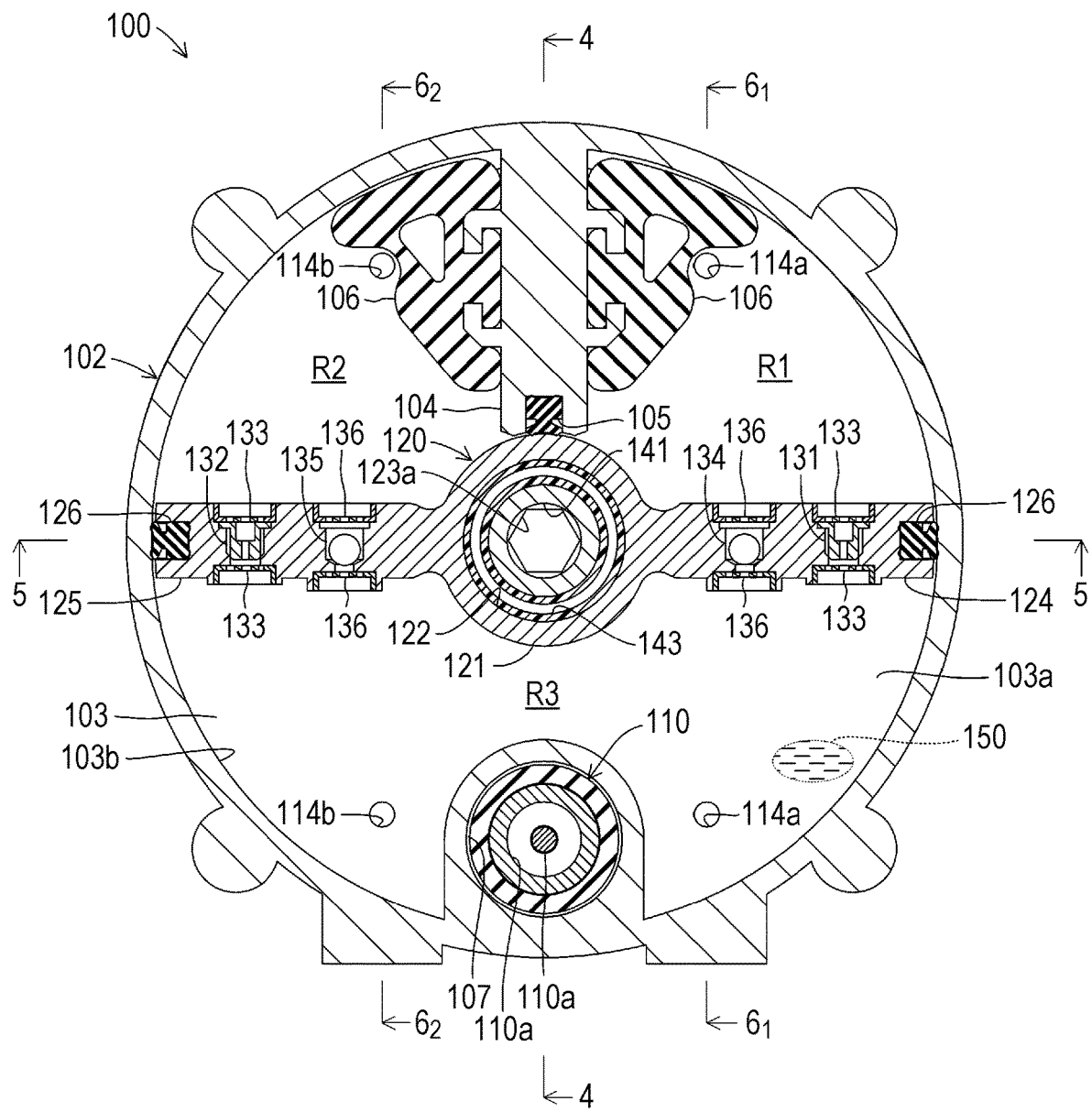
FIG. 3 is a sectional view showing the outline of an internal configuration of the rotary damper of FIG. 1 when the rotary damper is viewed in plane.
Figure 4:
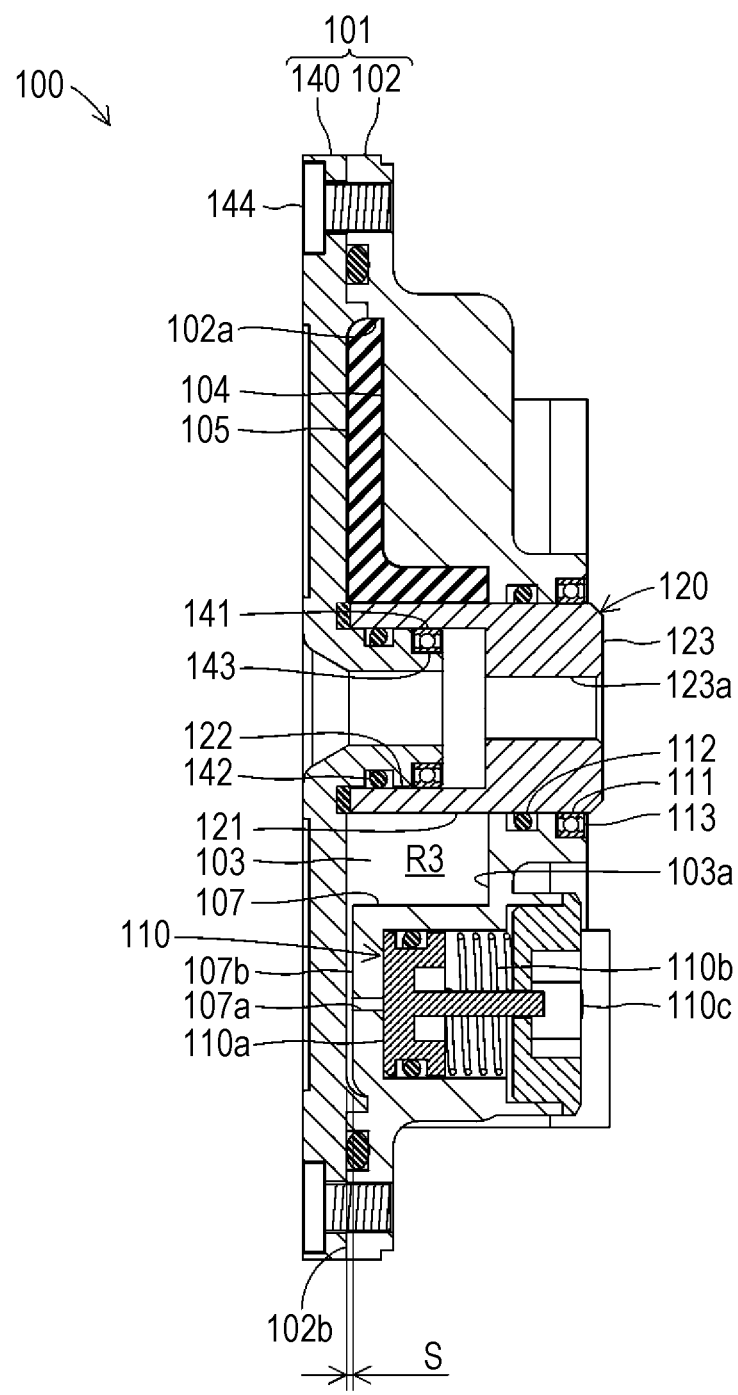
FIG. 4 is a sectional view showing the outline of the internal configuration of the rotary damper of FIG. 1 along a 4-4 line shown in FIG. 3.
Figure 5:
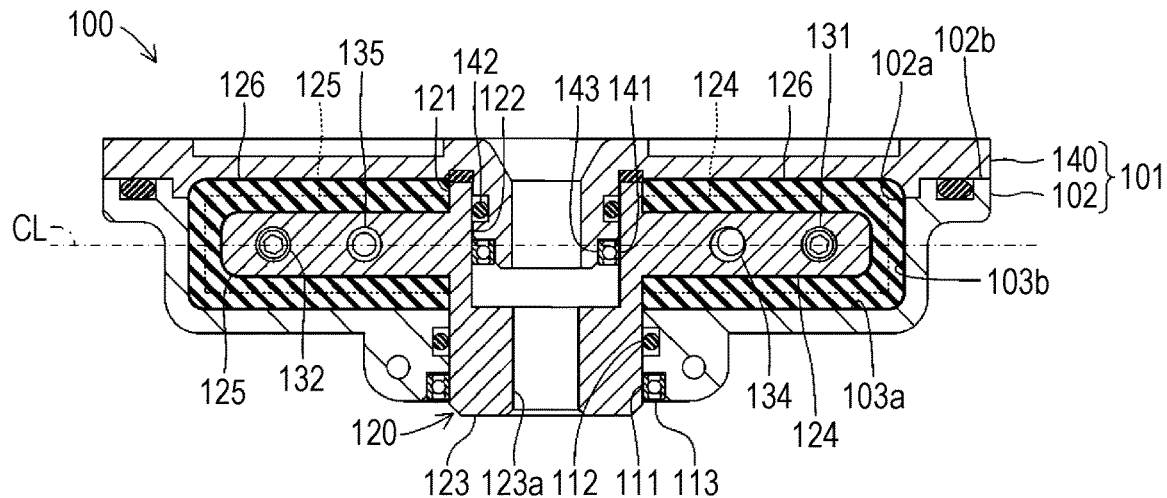
FIG. 5 is a sectional view showing the outline of the internal configuration of the rotary damper of FIG. 1 along a 5-5 line shown in FIG. 3.
Figure 6:
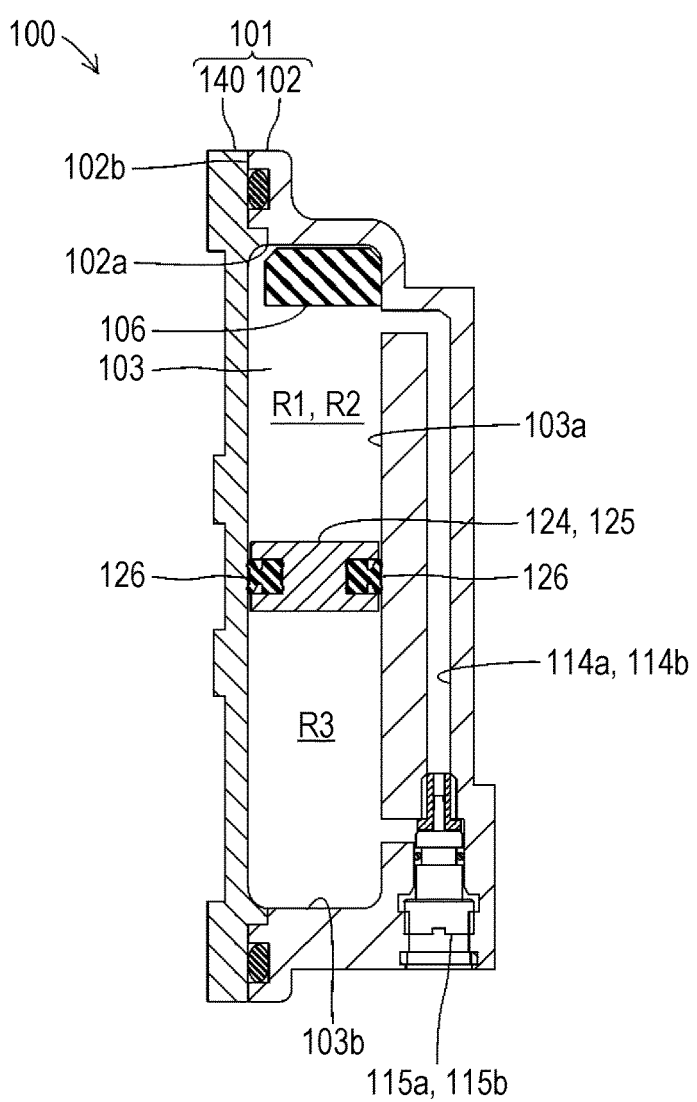
FIG. 6 is an end surface view showing the outline of the internal configuration of the rotary damper 100-of FIG. 1 along a $6_1$-$6_1$ line and a $6_2$-$6_2$ line shown in FIG. 3.

Hereinafter, one embodiment of a rotary damper according to the present invention will be described with reference to the drawings. FIG. 1 is a perspective view showing the outline of an entire configuration of a rotary damper 100 from a lid 140 side. Moreover, FIG. 2 is a perspective view showing the outline of the entire configuration of the rotary damper 100 of FIG. 1 from a housing body 102 side. Further, FIG. 3 is a sectional view showing the outline of an internal configuration of the rotary damper 100 of FIG. 1 when the rotary damper 100 is viewed in plane. In addition, FIG. 4 is a sectional view showing the outline of the internal configuration of the rotary damper 100 of FIG. 1 along a 4-4 line shown in FIG. 3. FIG. 5 is a sectional view showing the outline of the internal configuration of the rotary damper 100 of FIG. 1 along a 5-5 line shown in FIG. 3. FIG. 6 is an end surface view showing the outline of the internal configuration of the rotary damper 100 of FIG. 1 along a $6_1$-$6_1$ line and a $6_2$-$6_2$ line shown in FIG. 3. The rotary damper 100 is a mechanical device configured to provide a predetermined amount of load to turning of a joint of an articulated robot.

(Configuration of Rotary Damper 100)

The rotary damper 100 includes a housing 101. The housing 101 is a component forming a housing of the rotary damper 100 while turnably holding a rotor 120. The rotary damper 100 is made of an aluminum material, an iron material, a zinc material, or various resin materials such as polyamide resin. Specifically, the housing 101 mainly includes a housing body 102 and a lid 140.

The housing body 102 is a component housing movable vanes 124, 125 of the rotor 120 and fluid 150 as described later and turnably supporting one end portion of a shaft 121 of the rotor 120. The housing body 102 is formed in a bottomed cylindrical shape opening large at one end of a tubular body and opening small at the other end.

More specifically, in the housing body 102, a cylindrical inner chamber 103 is formed on an opening 102*a* side on which the housing body 102 opens large at the one end of the tubular body. Further, each of a second rotor support portion 111 and bypass paths 114*a*, 114*b* is formed at a bottom portion 103*a* of the inner chamber 103. In addition, at the housing body 102, a lid attachment portion 102*b* to which the lid 140 is to be attached is formed to project in a flange shape on the outside of an opening 102*a*.

The inner chamber 103 is a space liquid-tightly housing the movable vanes 124, 125 of the rotor 120 and the fluid 150. The inner chamber 103 is formed as two semicylindrical spaces facing each other through the rotor 120 arranged at a center portion in the housing body 102. In the inner chamber 103, each of a fixed vane 104 and an accumulator holding portion 107 is formed integrally with the housing body 102.

The fixed vane 104 is a wall-shaped portion configured such that the fixed vane 104 and the rotor 120 together divide part of the inside of the inner chamber 103 into a first cell R1 and a second cell R2. The fixed vane 104 is formed to project in a raised shape inwardly from an inner chamber wall surface 103*b* along an axial direction of the housing body 102. Of the fixed vane 104, a tip end portion facing each of the lid 140 and the shaft 121 of the rotor 120 as described later is formed in a recessed groove shape. A seal 105 is fitted in this groove. Moreover, cushions 106 are each provided on two side surfaces of the fixed vane 104.

The seal 105 is a component for ensuring the liquid tightness of the first cell R1 and the second cell R2 formed in the inner chamber 103. The seal 105 is formed in an L-shape as viewed from the side from an elastic material such as various rubber materials including nitrile rubber, hydrogenated nitrile rubber, and fluorine-containing rubber. The seal 105 is attached to project from the tip end portion of the fixed vane 104 so as to slidably closely contact each of an inner surface of the lid 140 and an outer peripheral surface of the shaft 121 of the rotor 120.

The cushion 106 is a component for preventing direct collision of each of the movable vanes 124, 125 with the fixed vane 104 and preventing collision of each of the movable vanes 124, 125 with the accumulator holding portion 107. The cushion 106 is formed in a substantially triangular shape as viewed in plane from an elastic material such as various rubber materials including nitrile rubber, hydrogenated nitrile rubber, and fluorine-containing rubber. These cushions 106 are, with fitted in groove portions at both side surfaces of the fixed vane 104, attached to project from both side surfaces of the fixed vane 104.

The accumulator holding portion 107 is a portion for housing an accumulator 110. The accumulator holding portion 107 is formed in such a manner that the inner chamber wall surface 103*b* of the housing body 102 projects in a cylindrical shape to an inner chamber 103 side. In this case, the accumulator holding portion 107 opens at an outer peripheral portion of the bottom portion 103*a* on a bottom portion 103*a* side of the housing body 102, and is closed by a discoid partitioning portion 107*b* with a communication hole 107*a* on the lid 140 side.

The communication hole 107*a* is a through-hole allowing the inner chamber 103 and the inside of the accumulator holding portion 107 to communicate with each other such that the fluid 150 flows therebetween. Thus, the partitioning portion 107*b* is, at the accumulator holding portion 107, formed at such a position that a clearance S allowing the fluid 150 to flow therein can be formed between the accumulator holding portion 107 and the lid 140. In the present embodiment, the clearance S is set to 0.5 mm.

The accumulator 110 is a tool for compensating for a volume change in the inner chamber 103 due to expansion or contraction caused by a temperature change in the fluid 150. Specifically, the accumulator 110 mainly includes a piston 110*a*, a pressing elastic body 110*b*, a plug 110*c*, and the accumulator holding portion 107.

The piston 110*a* is a component configured to define the inner volume of the accumulator holding portion 107 communicating with the inner chamber 103 while increasing/decreasing such a volume. The piston 110*a* is configured such that a discoid body slidably fitted in the accumulator holding portion 107 is formed at a tip end portion of a rod extending in the axial direction in the accumulator holding portion 107. Thus, the accumulator holding portion 107 is not only a portion housing the accumulator 110, but also one component forming the accumulator 110. In this case, the accumulator 110 may be formed in such a manner that a cylindrical cylinder, in which the piston 110*a* is slidably fitted, to be fitted in the accumulator holding portion 107 is separately prepared.

The pressing elastic body 110*b* is a coil spring provided between the piston 110*a* and the plug 110*c* to elastically press the piston 110*a* to a communication hole 107*a* side. The plug 110*c* is a component configured to receive reactive force from the pressing elastic body 110*b*. The plug 110*c* is screwed into the opening end portion of the accumulator holding portion 107. That is, the accumulator 110 is assembled integrally with the housing body 102.

The second rotor support portion 111 is a portion configured to turnably support a protruding shaft portion 123 of the rotor 120. The second rotor support portion 111 is formed to protrude outwardly in a cylindrical shape in the axial direction from a center portion of the bottom portion 103*a* of the housing body 102. Thus, the center portion of the bottom portion 103*a* of the housing body 102 opens through the second rotor support portion 111. Each of a seal 112 and a bearing 113 is provided at an inner peripheral portion of the second rotor support portion 111.

The seal 112 is a component for preventing leakage of the fluid 150 from the inner chamber 103. The seal 112 is formed in a circular ring shape from an elastic material such as various rubber materials including nitrile rubber, hydrogenated nitrile rubber, and fluorine-containing rubber. The seal 112 is attached with fitted in a circular ring-shaped recessed portion at the inner peripheral portion of the second rotor support portion 111.

The bearing 113 is a component configured to turnably support the protruding shaft portion 123 of the rotor 120. The bearing 113 includes a circular ring-shaped bearing. The bearing 113 is attached with fitted in a circular ring-shaped recessed portion at a tip end portion of the second rotor support portion 111. Note that instead of the bearing, the bearing 113 may include a bush formed in a cylindrical shape from a metal material or a ceramic material.

The bypass path 114*a* is a path allowing the first cell R1 and a later-described third cell R3 in the inner chamber 103 to communicate with each other such that the fluid 150 flows therebetween and allowing each of the first cell R1 and the third cell R3 to communicate with the outside. The bypass path 114*b* is a path allowing the second cell R2 and the third cell R3 in the inner chamber 103 to communicate with each other such that the fluid 150 flows therebetween and allowing each of the second cell R2 and the third cell R3 to communicate with the outside.

These bypass paths 114a, 114b are formed at positions adjacent to the second rotor support portion 111 at the bottom portion 103a of the housing 101 such that the bypass paths 114a, 114b and the second rotor support portion 111 together protrude from an outer surface of the housing 101. Thus, the rotary damper 100 can be reduced in thickness and therefore in size as compared to the case of providing the bypass paths 114a, 114b at the lid 140 on the side opposite to the second rotor support portion 111. These bypass paths 114a, 114b are each provided with adjustment needles 115a, 115b.

The adjustment needles 115a, 115b are components for hermetically closing the bypass paths 114a, 114b from the outside and adjusting the flow rate of the flowing fluid 150. The adjustment needles 115a, 115b are turned using a tool (not shown) such as a screwdriver so that the flow rate of the fluid 150 can be increased/decreased.

The rotor 120 is a component arranged in the inner chamber 103 of the housing 101 to divide, together with the fixed vane 104, the inside of the inner chamber 103 into three spaces including the first cell R1, the second cell R2, and the third cell R3 and turning in the inner chamber 103 to increase/decrease the volume of each of the first cell R1 and the second cell R2. The rotor 120 mainly includes the shaft 121 and the movable vanes 124, 125.

The shaft 121 is a portion serving as a center shaft of the turning movable vanes 124, 125. The shaft 121 is formed in a cylindrical shape from an aluminum material, an iron material, a zinc material, or various resin materials such as polyamide resin. The shaft 121 mainly includes a tubular support portion 122 and the protruding shaft portion 123.

The tubular support portion 122 is a portion supporting each of the movable vanes 124, 125 and supported by a first rotor support portion 141 of the lid 140, and is formed in a cylindrical shape. In this case, the tubular support portion 122 is formed in such a cylindrical shape that an inner peripheral surface of the tubular support portion 122 is exposed to the axis of the shaft 121 in a state in which the later-described first rotor support portion 141 is not fitted in the tubular support portion 122. The entirety of the inside of the tubular support portion 122 is formed as a space for housing the first rotor support portion 141. Each of the movable vanes 124, 125 is formed at an outer peripheral portion of the tubular support portion 122. The tubular support portion 122 is formed such that the length thereof in the axial direction is substantially the same as the length (the length including a seal 126) of each of the movable vanes 124, 125 in the axial direction of the shaft 121.

The protruding shaft portion 123 is a portion supported on the second rotor support portion 111, a target (not shown) (the articulated robot in the present embodiment) for attachment to the rotary damper 100 being to be coupled to the protruding shaft portion 123. The protruding shaft portion 123 is formed to protrude and extend in the axial direction of the shaft 121 with respect to the movable vanes 124, 125. In the present embodiment, the protruding shaft portion 123 is formed in a tubular shape. In this case, an outer peripheral portion of the protruding shaft portion 123 is formed such that the sectional shape of a portion to be fitted in the second rotor support portion 111 is a circular shape.

An external coupling portion 123a is formed at an inner peripheral portion of the protruding shaft portion 123. The external coupling portion 123a is a portion to which the target for attachment to the rotary damper 100 is to be coupled. In the present embodiment, the external coupling portion 123a is formed in a tubular shape having a hexagonal sectional shape inscribed in a circle having a smaller diameter than that of the tubular support portion 122 and having a smaller diameter than the inner diameter of the first rotor support portion 141. Thus, a portion, which is formed with a hexagonal sectional shape and extending in a shaft shape, of the target for attachment to the rotary damper 100 is inserted into and coupled to the external coupling portion 123a.

As shown in FIG. 5, the movable vanes 124, 125 are components for liquid-tightly increasing/decreasing the volume of each space in the inner chamber 103 while dividing the inside of the inner chamber 103 into the plurality of spaces. The movable vanes 124, 125 include plate-shaped bodies extending in a radial direction of the shaft 121 (the inner chamber 103). In this case, these two movable vanes 124, 125 are formed to extend in opposite directions (in other words, on the same imaginary plane) through the shaft 121. Of each of these movable vanes 124, 125, a C-shaped (or a squared U-shaped) tip end portion facing each of the bottom portion 103a, the inner chamber wall surface 103b, and the inner surface of the lid 140 is formed in a recessed groove shape. The seals 126 are each fitted in these grooves.

As in the seal 105, the seal 126 is a component for ensuring liquid tightness between the first cell R1 and the third cell R3 and between the second cell R2 and the third cell R3 in the inner chamber 103. The seal 126 is formed in a C-shape (or a squared U-shape) as viewed from the side from an elastic material such as various rubber materials including nitrile rubber, hydrogenated nitrile rubber, and fluorine-containing rubber. The seal 126 is attached to project from the tip end portion of each of the movable vanes 124, 125 so as to slidably closely contact each of the bottom portion 103a, the inner chamber wall surface 103b, and the inner surface of the lid 140.

With this configuration, the movable vanes 124, 125 cooperate with the fixed vane 104 to liquid-tightly form three spaces including the first cell R1, the second cell R2, and the third cell R3 in the inner chamber 103. More specifically, in the inner chamber 103, the first cell R1 is formed by the fixed vane 104 and the movable vane 124, the second cell R2 is formed by the fixed vane 104 and the movable vane 125, and the third cell R3 is formed by the movable vane 124 and the movable vane 125. That is, the first cell R1, the second cell R2, and the third cell R3 are formed adjacent to each other in a peripheral direction in the inner chamber 103.

At these movable vanes 124, 125, bidirectional communication paths 131, 132 and one-way communication paths 134, 135 are formed. The bidirectional communication paths 131, 132 are configured to allow, with a limitation, the flow of the fluid 150 in both directions between the first cell R1 and the third cell R3 adjacent to each other and between the second cell R2 and the third cell R3 adjacent to each other. Specifically, the bidirectional communication paths 131, 132 include throttle valves. In this case, the flow of the fluid 150 with the limitation in the bidirectional communication paths 131, 132 means that the fluid 150 is less likely to flow under the same conditions (e.g., a pressure and a hydraulic liquid viscosity) in terms of the flowability of the fluid 150 in the bidirectional communication paths 131, 132.

Filters 133 are each provided at openings of both ends of each of the bidirectional communication paths 131, 132, the fluid 150 flowing in or out through the openings. The filter 133 is a component for preventing a foreign substance contained in the fluid 150 from flowing into each of the bidirectional communication paths 131, 132. The filter 133 is formed in a bottomed tubular shape from a mesh-shaped plate body made of metal or resin. Note that the filter 133 may be formed of a porous body such as a sponge.

The one-way communication paths 134, 135 are configured to allow the fluid 150 to flow only from one side to the other side between the first cell R1 and the third cell R3 adjacent to each other and between the second cell R2 and the third cell R3 adjacent to each other. Specifically, the one-way communication path 134 includes a one-way valve configured to allow the fluid 150 to flow from the third cell R3 only to the first cell R1, and the one-way communication path 135 includes a one-way valve configured to allow the fluid 150 to flow from the third cell R3 only to the second cell R2.

Filters 136 are each provided at openings of both ends of each of the one-way communication paths 134, 135, the fluid 150 flowing in or out through the openings. As in the filter 133, the filter 136 is a component for preventing a foreign substance contained in the fluid 150 from flowing into each of the one-way communication paths 134, 135. The filter 136 is formed in a bottomed tubular shape from a mesh-shaped plate body made of metal or resin. Note that the filter 136 may be formed of a porous body such as a sponge.

With these bidirectional communication paths 131, 132 and these one-way communication paths 134, 135, the flow of the fluid 150 among the first cell R1 to the third cell R3 is limited in the rotary damper 100, and accordingly, damping force is generated upon turning of the rotor 120.

The lid 140 is a component for liquid-tightly closing the inner chamber 103 formed in the housing body 102. The lid 140 is formed in such a flat plate circular ring shape that one end portion of the first rotor support portion 141 formed in a cylindrical shape projects in a flange shape. The first rotor support portion 141 is a cylindrical portion turnably supporting the tubular support portion 122 of the shaft 121 of the rotor 120. The first rotor support portion 141 includes a through-hole formed with a larger inner diameter than the size of a through-hole of the protruding shaft portion 123. Each of a seal 142 and a bearing 143 is provided at an outer peripheral portion of the first rotor support portion 141.

As in the seal 112, the seal 142 is a component for preventing leakage of the fluid 150 from the inner chamber 103. The seal 142 is formed in a circular ring shape from an elastic material such as various rubber materials including nitrile rubber, hydrogenated nitrile rubber, and fluorine-containing rubber. The seal 142 is attached with fitted in a circular ring-shaped recessed portion at the outer peripheral portion of the first rotor support portion 141.

As in the bearing 113, the bearing 143 is a component turnably supporting the tubular support portion 122 of the rotor 120. The bearing 143 includes a circular ring-shaped bearing. The bearing 143 is attached with fitted in a circular ring-shaped recessed portion at a tip end portion of the first rotor support portion 141. In this case, the bearing 143 supports the tubular support portion 122 at a center portion of the length of each of the movable vanes 124, 125 in the axial direction of the rotor 120. More specifically, the bearing 143 is fitted in the tubular support portion 122 to support the tubular support portion 122 at a position shifted to a protruding shaft portion 123 side from the center position CL of the length of each of the movable vanes 124, 125 in the axial direction of the rotor 120 in an area including the center position CL.

That is, the first rotor support portion 141 is formed such that the length thereof in the axial direction is such a length that the tubular support portion 122 can be supported at the center portion of the length of each of the movable vanes 124, 125 in the axial direction of the rotor 120. In this case, supporting the tubular support portion 122 at the center portion of the length of each of the movable vanes 124, 125 in the axial direction of the rotor 120 means not only supporting the tubular support portion 122 precisely at the center position CL, but also supporting the tubular support portion 122 substantially at the center position CL such as supporting the tubular support portion 122 at a position including the center position CL and supporting the tubular support portion 122 at a position which is shifted from the center position CL, but is adjacent enough to contact the center position CL. As in the bearing 113, the bearing 143 may include, instead of the bearing, a bush formed in a cylindrical shape from a metal material or a ceramic material.

The lid 140 is, at an outer edge portion thereof, attached onto the lid attachment portion 102*b* of the housing body 102 through a circular ring-shaped seal member with six bolts 144. With this configuration, the first rotor support portion 141 is supported on the housing body 102 through the lid 140. Moreover, in the rotary damper 100, the opening 102*a* is closed, and the inner chamber 103 is liquid-tightly sealed.

The fluid 150 is a substance for providing resistance to the movable vanes 124, 125 turning in the inner chamber 103 such that the rotary damper 100 fulfills a damper function thereof, and the inside of the inner chamber 103 is filled with the fluid 150. The fluid 150 includes a substance in the form of liquid, gel, or semi-solid having liquidity and having a viscosity according to the specifications of the rotary damper 100. In this case, the viscosity of the fluid 150 is selected as necessary according to the specifications of the rotary damper 100. In the present embodiment, the fluid 150 includes oil such as mineral oil and silicone oil. Note that the fluid 150 is shown only in hatched regions surrounded by dashed circles in FIG. 3 and FIGS. 7 and 8 described later.

In the present embodiment, the rotary damper 100 is configured such that the outer diameter of the housing 101 is 90 mm and the thickness of the housing 101 is 23 mm. Moreover, the length of each of the movable vanes 124, 125 in the axial direction of the shaft 121 is 12 mm. Needless to say, the size of the rotary damper 100 is set as necessary according to use application of the rotary damper 100.

(Actuation of Rotary Damper 100)

Next, actuation of the rotary damper 100 configured as described above will be described. The rotary damper 100 is attached to a shaft portion as a joint relatively rotatably coupling arms of the articulated robot (not shown), thereby providing the predetermined amount of load to turning of the shaft portion. In this case, one of two arms swings about the shaft portion relative to the other arm. The shaft portion as the joint of the articulated robot is inserted into the external coupling portion 123*a* from a first rotor support portion 141 side or a second rotor support portion 111 side, and accordingly, such a shaft portion can be coupled to the external coupling portion 123*a* in the rotary damper 100. Note that in this case, the housing 101 of the rotary damper 100 is fixed to a component of the articulated robot, the shaft portion as the joint rotating relative to such a component.

Figure 7:
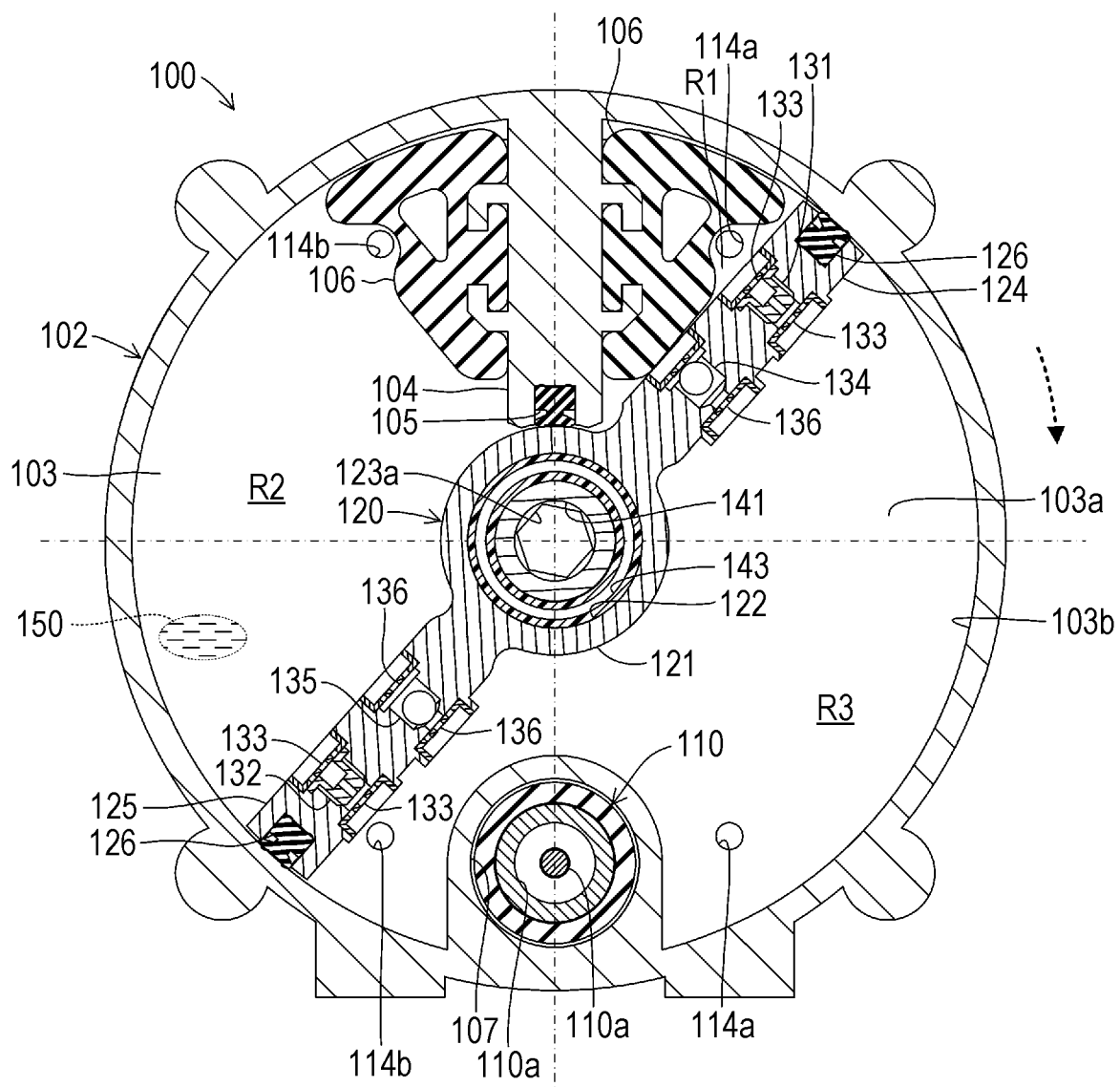
FIG. 7 is a sectional view showing a state in which a rotor of the rotary damper shown in FIG. 3 has turned to a turning limit in a counterclockwise direction.

First, in a state in which the one arm of the articulated robot has turned to one swing limit position in a swing direction, the rotary damper 100 is, as shown in FIG. 7, in a state in which the movable vane 124 is closest to the fixed vane 104 and the movable vane 125 is closest to the accumulator holding portion 107. That is, in the rotary damper 100, the volume of the first cell R1 is the minimum, and the volume of the second cell R2 is the maximum. In this case, for the movable vanes 124, 125, contact of the movable vane 124 with the cushion 106 can prevent collision of the movable vane 124 with the fixed vane 104 and collision of the movable vane 125 with the accumulator holding portion 107.

In a case where the one arm of the articulated robot has turned to the other swing limit side (see a dashed arrow in FIG. 7) in the swing direction from the above-described state (see FIG. 3), the rotor 120 turns clockwise as viewed in the figure. That is, in the rotary damper 100, the movable vane 124 turns toward the accumulator holding portion 107, and the movable vane 125 turns toward the fixed vane 104. Accordingly, in the rotary damper 100, the volume of the first cell R1 increases, and the volume of the second cell R2 decreases.

In this case, the fluid 150 in the third cell R3 flows, through the one-way communication path 134, into the first cell R1 which has had the minimum volume. Moreover, the fluid 150 in the second cell R2 which has had the maximum volume moves into the third cell R3 through the bidirectional communication path 132. That is, in the rotary damper 100, in a case where the rotor 120 turns clockwise as viewed in the figure, the fluid 150 in the second cell R2 flows through the bidirectional communication path 132, and accordingly, resistive force is generated. Accordingly, when the one arm of the articulated robot turns to the other swing limit side in the swing direction, the articulated robot receives, as the load, the resistive force generated by the rotary damper 100, and turning force is damped.

Figure 8:
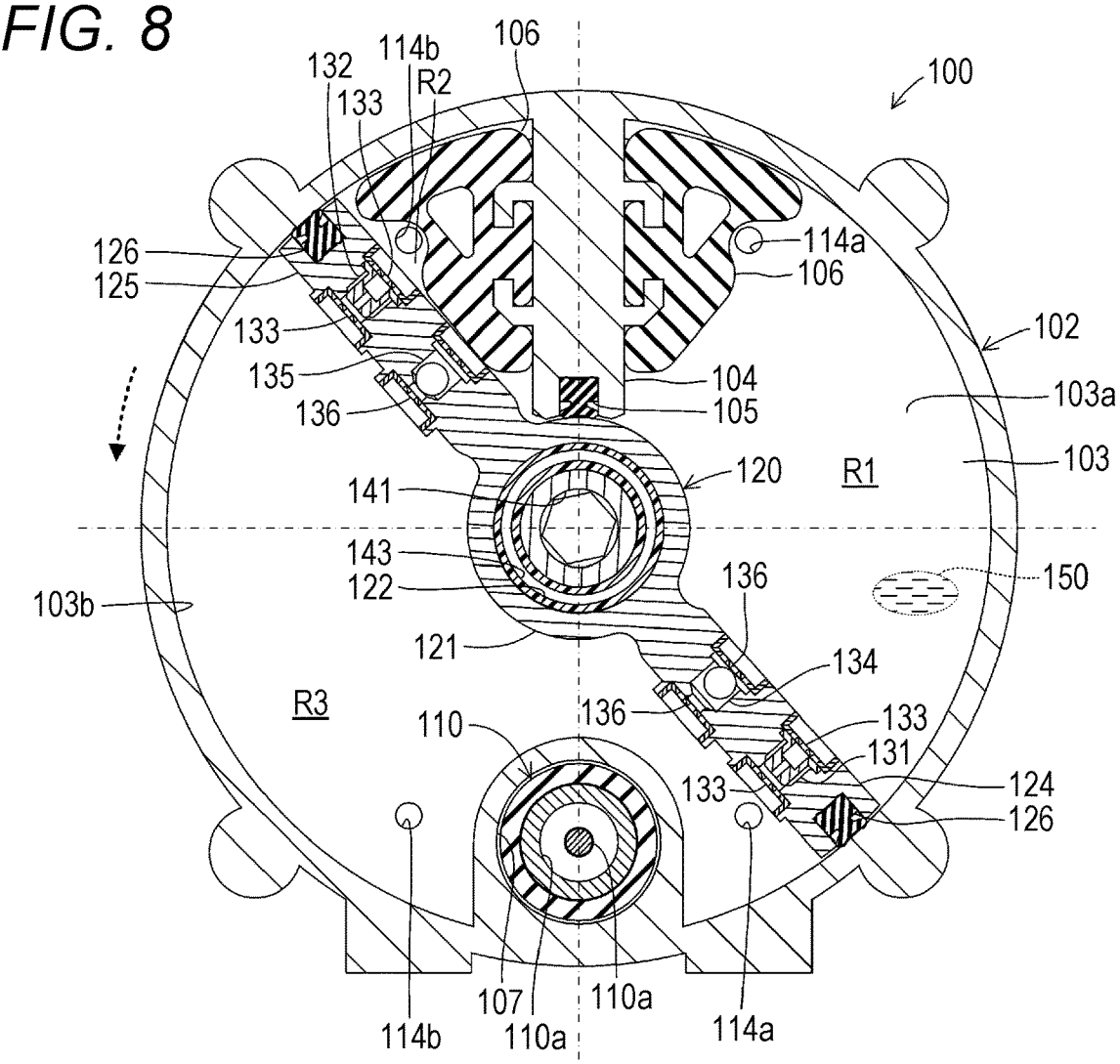
FIG. 8 is a sectional view showing a state in which the rotor of the rotary damper shown in FIG. 3 has turned to a turning limit in a clockwise direction.

Next, in a state in which the one arm of the articulated robot has turned to the other swing limit position in the swing direction, the rotary damper 100 is, as shown in FIG. 8, in a state in which the movable vane 124 is closest to the accumulator holding portion 107 and the movable vane 125 is closest to the fixed vane 104. That is, in the rotary damper 100, the volume of the first cell R1 is the maximum, and the volume of the second cell R2 is the minimum. In this case, for the movable vanes 124, 125, contact of the movable vane 125 with the cushion 106 can prevent collision of the movable vane 125 with the fixed vane 104 and collision of the movable vane 124 with the accumulator holding portion 107.

In a case where the one arm of the articulated robot has turned to the one swing limit side (see a dashed arrow in FIG. 8) in the swing direction from the above-described state (see FIG. 3), the rotor 120 turns counterclockwise as viewed in the figure. That is, in the rotary damper 100, the movable vane 124 turns toward the fixed vane 104, and the movable vane 125 turns toward the accumulator holding portion 107. Accordingly, in the rotary damper 100, the volume of the first cell R1 decreases, and the volume of the second cell R2 increases.

In this case, the fluid 150 in the third cell R3 flows, through the one-way communication path 135, into the second cell R2 which had the minimum volume. Moreover, the fluid 150 in the first cell R1 which had the maximum volume moves into the third cell R3 through the bidirectional communication path 131. That is, in the rotary damper 100, in a case where the rotor 120 turns counterclockwise as viewed in the figure, the fluid 150 in the first cell R1 flows through the bidirectional communication path 131, and accordingly, resistive force is generated. Accordingly, when the one arm of the articulated robot turns to the one swing limit side in the swing direction, the articulated robot receives, as the load, the resistive force generated by the rotary damper 100, and turning force is damped.

Upon clockwise or counterclockwise swing of the rotor 120 as viewed in the figure as described above and stoppage of the rotor 120, the tubular support portion 122 is supported on the first rotor support portion 141, and the protruding shaft portion 123 is supported on the second rotor support portion 111. Thus, the rotor 120 can turn or be stopped stably in the inner chamber 103. Note that FIGS. 7 and 8 show a turning direction of the rotor 120 by the dashed arrows.

As can be understood from description of the actuation method above, in the rotary damper 100 according to the above-described embodiment, the first rotor support portion 141 supported on the housing 101 turnably supports the tubular support portion 122 of the rotor 120 at the center portion of the length of each of the movable vanes 124, 125 in the axial direction of the rotor 120. Thus, the length of the rotor 120 is shortened as compared to the case of supporting both end portions of the rotor 120, so that the configuration of the rotary damper 100 can be easily reduced in size.

Further, implementation of the present invention is not limited to the above-described embodiment, and various changes can be made without departing from the object of the present invention. Note that in description of each variation, the same reference numerals are used to represent elements similar to those of the above-described embodiment and overlapping description thereof will be omitted.

For example, in the above-described embodiment, the rotary damper 100 includes one fixed vane 104 and two movable vanes 124, 125. However, it may only be required that the rotary damper 100 includes at least one fixed vane and one movable vane. Thus, the rotary damper 100 may include two fixed vanes or three or more fixed vanes, for example. Alternatively, the rotary damper 100 may include one movable vane or three or more movable vanes, for example. Note that the movable vane needs to be formed outside the tubular support portion 122 of the shaft 121 in the radial direction.

Figure 9:
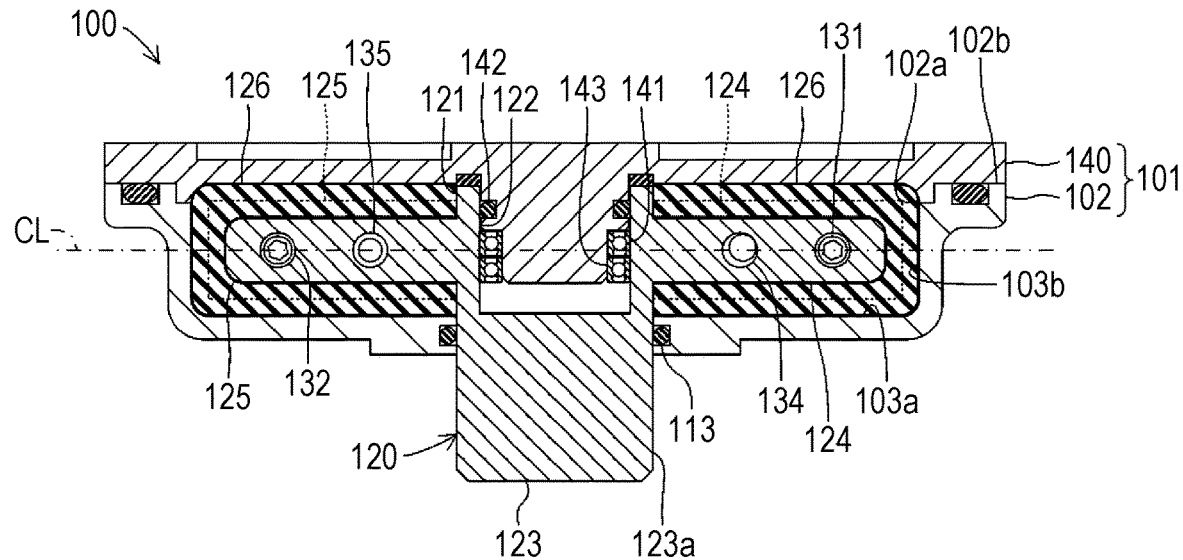
FIG. 9 is a sectional view showing the outline of an internal configuration of a rotary damper according to a variation of the present invention.

In the above-described embodiment, the tubular support portion 122 of the rotor 120 is formed as the through-hole communicating with the external coupling portion 123a of the protruding shaft portion 123. However, the tubular support portion 122 may be, as shown in FIG. 9, formed as a bottomed hole not communicating with the external coupling portion 123a of the protruding shaft portion 123, for example.

In the above-described embodiment, the tubular support portion 122 is configured to house only the first rotor support portion 141 in the space inside the tubular support portion 122. With this configuration, in the rotary damper 100, an increase in the size of the rotary damper 100 in the radial direction can be avoided while a sufficient thickness of the first rotor support portion 141 can be ensured and the stiffness of the first rotor support portion 141 can be enhanced even in the case of forming the first rotor support portion 141 in a tubular shape or the case of forming the first rotor support portion 141 in a solid columnar shape. However, the tubular support portion 122 may be configured such that a component other than the first rotor support portion 141 is arranged therein.

In the above-described embodiment, the first rotor support portion 141 turnably supports the tubular support portion 122 through the bearing 143. However, the bearing 143 may be omitted from the first rotor support portion 141, and the tubular support portion 122 may be directly turnably supported on the first rotor support portion 141.

In the above-described embodiment, the first rotor support portion 141 is formed in the tubular shape. With this configuration, the first rotor support portion 141 can efficiently release heat generated between the first rotor support portion 141 and the tubular support portion 122. However, the first rotor support portion 141 may be, instead of the tubular shape, formed in a solid columnar shape as shown in FIG. 9 so that the stiffness of the first rotor support portion 141 can be enhanced. Note that as in the first rotor support portion 141, the bearing 113 may be omitted from the second rotor support portion 111 and the protruding shaft portion 123 may be directly turnably supported on the second rotor support portion 111.

In the above-described embodiment, the length of the portion (the bearing 143) of the first rotor support portion 141 supporting the tubular support portion 122 is shorter than the length (the length including the seal 126) of each of the movable vanes 124, 125 in the axial direction of the shaft 121. However, the length of the portion of the first rotor support portion 141 supporting the tubular support portion 122 may be a length equal to or longer than the length of each of the movable vanes 124, 125 in the axial direction of the shaft 121. With this configuration, the first rotor support portion 141 can stably support the rotor 120. Moreover, the length of the portion of the first rotor support portion 141 supporting the tubular support portion 122 is, as shown in FIG. 9, set to a length which is equal to or shorter than the length of each of the movable vanes 124, 125 in the axial direction of the shaft 121 and is equal to or longer than the half of such a length, and therefore, the rotor 120 can be stably supported. In FIG. 9, the first rotor support portion 141 supports the tubular support portion 122 through two bearings 143.

In the above-described embodiment, the first rotor support portion 141 is formed at the lid 140. However, the first rotor support portion 141 may be formed at the housing body 102 as in the second rotor support portion 111. In this case, the first rotor support portion 141 is formed in such a manner that the center portion of the bottom portion 103a of the housing body 102 is positioned on a tubular support portion 122 side. Moreover, in this case, the rotary damper 100 may be formed without the second rotor support portion 111. The protruding shaft portion 123 is formed on the lid 140 side with respect to the tubular support portion 122, so that the second rotor support portion 111 can be formed at the lid 140.

In the above-described embodiment, the housing 101 includes the second rotor support portion 111. With this configuration, the housing 101 can stably support the rotor 120. However, as shown in FIG. 9, the housing 101 may be formed without the second rotor support portion 111. Specifically, in the housing 101, the length of the portion of the first rotor support portion 141 supporting the tubular support portion 122 is set to equal to or longer than the half of the length of each of the movable vanes 124, 125 in the axial direction of the shaft 121, so that the second rotor support portion 111 can be omitted.

In the case of omitting the second rotor support portion 111 as described above, a cylindrical protruding portion which is provided for holding only the seal 112 and is equivalent to the second rotor support portion 111 may be provided at the housing 101 for ensuring liquid tightness in the inner chamber 103, and the protruding shaft portion 123 may be fitted in such a cylindrical protruding portion.

In the above-described embodiment, the external coupling portion 123a is formed at the inner peripheral portion of the protruding shaft portion 123. However, the external coupling portion 123a may be formed at an outer peripheral portion of the protruding shaft portion 123 as shown in FIG. 9. That is, the external coupling portion 123a may be formed in such a manner that the outer peripheral portion of the hollow or solid protruding shaft portion 123 is formed in a rod shape having a hexagonal sectional shape. Instead of the protruding shaft portion 123, the external coupling portion 123a may be formed at part of the tubular support portion 122.

In the above-described embodiment, the bidirectional communication paths 131, 132 and the one-way communication paths 134, 135 are respectively provided at the movable vanes 124, 125. That is, the bidirectional communication paths 131, 132 and the one-way communication paths 134, 135 are equivalent to a communication path according to the present invention. However, the bidirectional communication paths 131, 132 and the one-way communication paths 134, 135 may be provided at the fixed vane 104 instead of or in addition to those at the movable vanes 124, 125.

In the above-described embodiment, the housing body 102 is provided with the bypass paths 114a, 114b and the adjustment needles 115a, 115b. However, the housing body 102 may be formed without the bypass paths 114a, 114b and the adjustment needles 115a, 115b. Alternatively, the bypass paths 114a, 114b and the adjustment needles 115a, 115b may be formed at the lid 140 instead of or in addition to those at the housing body 102.

In the above-described embodiment, the housing body 102 includes each of the accumulator holding portion 107 and the accumulator 110. In this case, the accumulator holding portion 107 is formed to project into the inner chamber 103 in the housing body 102. However, the accumulator holding portion 107 may be formed to project to the outside of the housing body 102. Alternatively, the housing body 102 may be formed without each of the accumulator holding portion 107 and the accumulator 110.

In the above-described embodiment, the housing body 102 includes the cushions 106. With this configuration, impact or damage due to collision of each of the movable vanes 124, 125 with the fixed vane 104 upon turning in the rotary damper 100 can be prevented. However, the housing body 102 may be formed without the cushions 106.

In the rotary damper 100 of the above-described embodiment, the housing 101 is on a fixed side, and the rotor 120 is on a movable side. However, the rotor 120 turns relative to the housing 101 in the rotary damper 100. Thus, in the rotary damper 100, the housing 101 may be on the movable side, and the rotor 120 may be on the fixed side, needless to say.

In the above-described embodiment, the rotary damper 100 is used for the joint of the articulated robot. However, the rotary damper 100 may be provided between two components movably coupled to each other. Thus, in addition to the articulated robot, the rotary damper 100 may be, upon use thereof, attached to a joint of a power assist suit, a joint of exercise equipment, a movable portion (e.g., an opening/closing mechanism for a swing arm or a seat) of a two-wheeled self-propelled vehicle, a movable portion (e.g., a suspension mechanism, a seat mechanism, or an opening/closing door in a four-wheeled self-propelled vehicle) of a vehicle other than a two-wheeled self-propelled vehicle, or each movable portion of a mechanical device, an electrical device, or a tool other than a self-propelled vehicle.

LIST OF REFERENCE SIGNS

R1 First Cell
R2 Second Cell
R3 Third Cell
S Clearance
CL Center Position of Length of Movable Vane in Axial direction of Shaft
100 Rotary Damper
101 Housing
102 Housing Body
102a Opening
102b Lid Attachment Portion
103 Inner Chamber
103a Bottom Portion
103b Inner Chamber Wall Surface
104 Fixed Vane
105 Seal
106 Cushion
107 Accumulator Holding Portion
107a Communication Hole
107b Partitioning Portion
110 Accumulator
110a Piston
110b Pressing Elastic Body
110c Plug
111 Second Rotor Support Portion
112 Seal
113 Bearing
114a, 114b Bypass Path
115a, 115b Adjustment Needle
120 Rotor
121 Shaft
122 Tubular Support Portion
123 Protruding Shaft Portion
123a External Coupling Portion
124, 125 Movable Vane
126 Seal
131, 132 Bidirectional Communication Path
133 Filter
134, 135 One-Way Communication Path
136 Filter
140 Lid
141 First Rotor Support Portion
142 Seal
143 Bearing
144 Bolt
150 Fluid

The invention claimed is:

1. A rotary damper comprising
a housing having a cylindrical inner chamber for liquid-tightly housing fluid and having a fixed vane formed in a wall shape along a radial direction in the inner chamber to prevent a flow of the fluid in a peripheral direction,
a rotor formed with a penetrating or bottomed tubular support portion in a shaft and having, at an outer peripheral portion of the shaft outside the tubular support portion, a movable vane turning to push the fluid while dividing an inside of the inner chamber, the rotor comprising a protruding shaft portion protruding in an axial direction of the rotor with respect to the movable vane at the shaft,
a lid provided at the housing to liquid-tightly close the inner chamber, and
at least two cells formed by the fixed vane and the movable vane in the inner chamber and having volumes increased or decreased according to a turning direction of the movable vane,
the rotary damper further comprising:
a cylindrical or shaft-shaped first rotor support portion formed at one of the housing or the lid to turnably support an inner peripheral surface of the tubular support portion of the rotor; and
a second rotor support portion provided at another one of the housing or the lid to turnably support the shaft of the rotor, the second rotor support portion being formed in a cylindrical shape turnably supporting the protruding shaft portion,
wherein the first rotor support portion supports the tubular support portion at a center portion of a length of the movable vane in the axial direction of the rotor,
a first seal and a first bearing are provided at an inner peripheral portion of the first rotor support portion, the first bearing is attached at a tip end portion of the first rotor support portion, and
a second seal and a second bearing are provided at an inner peripheral portion of the second rotor support portion, the second bearing is attached at a tip end portion of the second rotor support portion.

2. The rotary damper according to claim 1, wherein the second rotor support portion turnably supports an outer peripheral portion of the protruding shaft portion.

3. The rotary damper according to claim 1, wherein the protruding shaft portion is formed in a tubular shape having a through-hole communicating with the tubular support portion.

4. The rotary damper according to claim 1, wherein only one fixed vane as said fixed vane is formed in the inner chamber.

5. The rotary damper according to claim 1, further comprising:
at least at one of the fixed vane or the movable vane, a cushion configured to elastically contact another one of the fixed vane or the movable vane.

6. The rotary damper according to claim 1, wherein the housing includes, at a position adjacent to the inner chamber, an accumulator holding portion configured to hold an accumulator for absorbing a volume change in the inner chamber due to expansion or contraction of the fluid.

7. The rotary damper according to claim 1, further comprising:
at least at one of the fixed vane or the movable vane, a communication path allowing the fluid to flow between cells adjacent to each other,
wherein the communication path includes a filter configured to filter out a foreign substance contained in the fluid.

8. The rotary damper according to claim 1, further comprising:
a bypass path allowing the at least two cells to communicate with each other; and
an adjustment needle configured to adjust a flow rate of the fluid in the bypass path,
wherein the bypass path is formed adjacent to the second rotor support portion of the housing or the lid.

9. The rotary damper according to claim 1, wherein the tubular support portion houses only the first rotor support portion in a space inside the tubular support portion.

10. The rotary damper according to claim 1, wherein
the first rotor support portion has a circular ring-shaped recessed portion in the inner peripheral portion of the first rotor support portion, and
the first bearing is fitted in the circular ring-shaped recessed portion.

11. The rotary damper according to claim 1, wherein
the second rotor support portion has a circular ring-shaped recessed portion in the inner peripheral portion of the second rotor support portion, and
the second bearing is fitted in the circular ring-shaped recessed portion.

* * * * *

UNITED STATES PATENT AND TRADEMARK OFFICE
CERTIFICATE OF CORRECTION

| | | |
|---|---|---|
| PATENT NO. | : 12,140,197 B2 | Page 1 of 1 |
| APPLICATION NO. | : 17/755258 | |
| DATED | : November 12, 2024 | |
| INVENTOR(S) | : Kazumasa Nakaya | |

It is certified that error appears in the above-identified patent and that said Letters Patent is hereby corrected as shown below:

In the Specification

Column 4, Line 23, delete "rotary damper 100-of" and insert --rotary damper of--.

Signed and Sealed this
Tenth Day of June, 2025

Coke Morgan Stewart
*Acting Director of the United States Patent and Trademark Office*